United States Patent
Hamamura et al.

(10) Patent No.: US 7,315,399 B2
(45) Date of Patent: Jan. 1, 2008

(54) IMAGE FORMING APPARATUS AND IMAGE FORMING METHOD

(75) Inventors: Naoko Hamamura, Yokohama (JP); Haruko Kawakami, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 287 days.

(21) Appl. No.: 10/946,389

(22) Filed: Sep. 22, 2004

(65) Prior Publication Data

US 2005/0036156 A1 Feb. 17, 2005

Related U.S. Application Data

(63) Continuation of application No. 09/641,337, filed on Aug. 18, 2000, now Pat. No. 6,894,808.

(30) Foreign Application Priority Data

Aug. 19, 1999 (JP) ................................. 11-232735

(51) Int. Cl.
   *G06F 15/00* (2006.01)
(52) U.S. Cl. .................... 358/1.9; 358/537; 358/538; 358/451; 358/448
(58) Field of Classification Search ................ 358/1.9, 358/537, 538, 451, 448
   See application file for complete search history.

(56) References Cited

U.S. PATENT DOCUMENTS

| | | | |
|---|---|---|---|
| 4,679,096 A | 7/1987 | Nagashima | |
| 4,783,837 A * | 11/1988 | Kawamura et al. | 382/270 |
| 5,040,232 A * | 8/1991 | Kanno | 382/305 |
| 5,200,840 A * | 4/1993 | Koike et al. | 358/451 |
| 5,287,204 A | 2/1994 | Koizumi et al. | |
| 5,465,161 A | 11/1995 | Funada et al. | |
| 5,553,201 A | 9/1996 | Muramatsu | |
| 5,748,345 A | 5/1998 | Ozaki et al. | |
| 5,900,948 A * | 5/1999 | Shigeeda et al. | 358/448 |
| 5,901,274 A | 5/1999 | Oh | |
| 6,091,513 A * | 7/2000 | Ishihara et al. | 358/1.9 |
| 6,522,359 B1 * | 2/2003 | Yamashita | 348/312 |
| 6,580,521 B1 | 6/2003 | Nishikawa et al. | |
| 6,674,551 B1 | 1/2004 | Takura | |

FOREIGN PATENT DOCUMENTS

JP        6-68246 A     3/1994

* cited by examiner

*Primary Examiner*—Kimberly Williams
*Assistant Examiner*—Michael Burleson
(74) *Attorney, Agent, or Firm*—Foley & Lardner LLP (57) ABSTRACT

An input section performs a color conversion process, etc. for image data from a color scanner section. A discrimination section generates a discrimination signal representative of "character", "non-character", etc. on the basis of an image signal from the input section. A first processing section performs a filtering process, etc. for the image signal from the input section, and switches the method of such a process on the basis of the discrimination signal from the discrimination section. An enlargement/reduction section enlarges or reduces the discrimination signal from the discrimination section and the image signal from the first processing section. A second processing section subjects the enlarged/reduced image signal form the enlargement/reduction section to a black-added printing process, a gamma conversion process, etc., and switches the method of such a process on the basis of the enlarged/reduced discrimination signal from the enlargement/reduction section.

12 Claims, 8 Drawing Sheets

IMAGE FORMING APPARATUS AND IMAGE FORMING METHOD

CROSS-REFERENCE TO RELATED APPLICATIONS

The present application is a continuation of U.S. application Ser. No. 09/641,337, filed Aug. 18, 2000 now U.S. Pat. No. 6,894,808, the entire contents of which are incorporated herein by reference.

This application is based upon and claims the benefit of priority from the prior Japanese Patent Application No. 11-232735, filed Aug. 19, 1999, the entire contents of which are incorporated herein by reference.

BACKGROUND OF THE INVENTION

The present invention relates to an image forming apparatus for subjecting an input image signal to, for example, a color conversion process, an enlargement/reduction process, etc. in an image forming apparatus, such as a digital copying machine, which reads a color image on an original and produces a copy image thereof.

In general, in a digital copying machine or a laser printer, in order to produce an output image which is clearer and favorably accepted by users, an original to be input or an input image signal is discriminated into a character portion and other portions in units of a pixel or an area by using a discrimination signal, and an image processing method to be carried out within the digital copying machine or laser printer is switched according to the discrimination signal.

Where an input image is to be enlarged or reduced to produce an output image at the request of the user, the discrimination signal, too, may be enlarged/reduced in addition to the enlargement/reduction of the input image, depending on the scheme of the image processing. In the prior art, a fixed discrimination signal has been enlarged/reduced by arithmetic operations, irrespective of characteristics of the input image.

However, there is a case where a proper image process varies depending on whether the input image is an image with emphasis on a gray scale, such as a photographic image, or a character image, or a color image, or a black-and-white image. If the discrimination signal is merely enlarged/reduced without considering this matter, the obtained discrimination signal may designate an image process which is not suitable for the characteristic of the image on the original.

BRIEF SUMMARY OF THE INVENTION

An object of the present invention is to provide an image processing apparatus and an image forming method capable of performing an enlargement/reduction process with less error relative to an image on an original, thereby producing a high-quality output image.

Another object of the invention is to provide an image processing apparatus and an image forming method capable of producing, where an input image is a color image, an output image with still higher quality, by taking into account the image characteristic or chromatic characteristic associated with each of the colors of the image.

In order to achieve the above objects, according to an aspect of the present invention, there is provided an image processing apparatus for subjecting an input image signal to an enlargement/reduction process on the basis of a predetermined enlargement/reduction magnification, the apparatus comprising:

first discrimination means for generating a first discrimination signal by determining an attribute of each of pixels on the basis of the input image signal;

image enlargement/reduction means for subjecting the input image signal to the enlargement/reduction process on the basis of the enlargement/reduction magnification;

second discrimination means for generating a second discrimination signal by subjecting the first discrimination signal from the first discrimination means to the enlargement/reduction process on the basis of the enlargement/reduction magnification; and image processing means for performing an image process for the enlarged/reduced image signal from the image enlargement/reduction means on the basis of the second discrimination signal.

According to another aspect of the invention, there is provided an image processing apparatus for subjecting an input image signal to an enlargement/reduction process on the basis of a predetermined enlargement/reduction magnification, the apparatus comprising:

first discrimination means for generating a first discrimination signal by determining an attribute of each of at least one area obtained by dividing an input image on the basis of the input image signal;

second discrimination means for generating a second discrimination signal by determining an attribute of each of pixels on the basis of the input image signal and the first discrimination signal from the first discrimination means;

image enlargement/reduction means for subjecting the input image signal to the enlargement/reduction process on the basis of the enlargement/reduction magnification;

third discrimination means for generating a third discrimination signal by subjecting the second discrimination signal from the second discrimination means to the enlargement/reduction process on the basis of the enlargement/reduction magnification; and image processing means for performing an image process for the enlarged/reduced image signal from the image enlargement/reduction means on the basis of the third discrimination signal.

According to still another aspect of the invention, there is provided an image processing method for subjecting an input image signal to an enlargement/reduction process on the basis of a predetermined enlargement/reduction magnification, the method comprising the steps of:

generating a first discrimination signal by determining an attribute of each of pixels on the basis of the input image signal;

subjecting the input image signal to the enlargement/reduction process on the basis of the enlargement/reduction magnification;

generating a second discrimination signal by subjecting the first discrimination signal from the first discrimination means to the enlargement/reduction process on the basis of the enlargement/reduction magnification; and performing an image process for the enlarged/reduced image signal from the image enlargement/reduction means on the basis of the second discrimination signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

A first embodiment of the invention will be described below.

Figure 1:
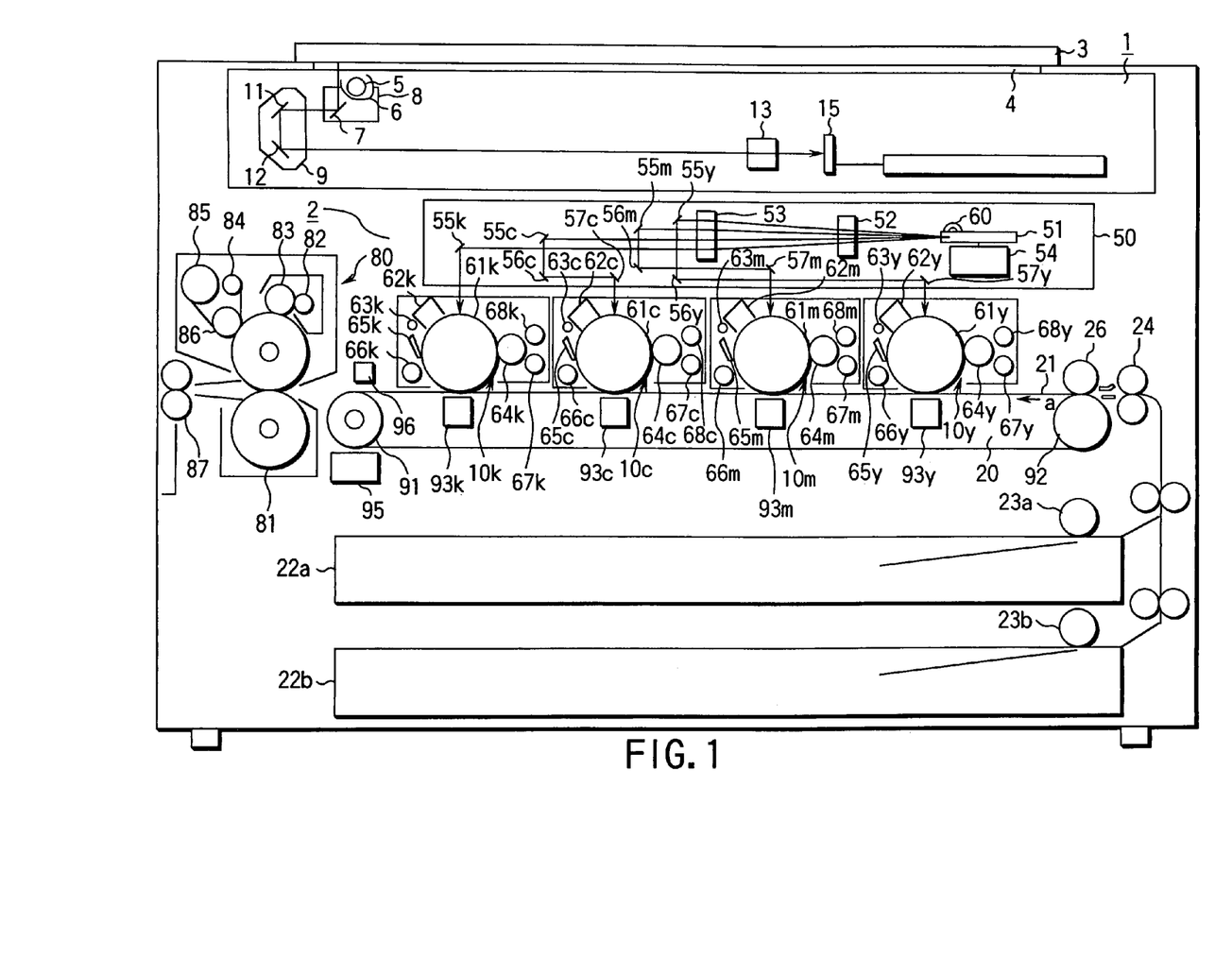
FIG. 1 is a side view schematically showing an internal structure of an image forming apparatus to which image processing apparatuses according to embodiments of the present invention are applied.

FIG. 1 schematically shows an internal structure of an image forming apparatus such as a digital color copying machine for reading a color image on an original and producing a copy image thereof. To this image forming apparatus, the image processing apparatus according to the present invention is applied.

In general terms, the image forming apparatus comprises a color scanner section 1 serving as image input means for reading and inputting a color image on an original, and a color printer section 2 serving as image output means for producing a copy image of the input color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left (in FIG. 1). The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in FIG. 1) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly deflecting the reflection light from the original which has been guided by the first mirror 7, and a third mirror 12 for deflecting the reflection from the second mirror 11 to the right in FIG. 1. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13.

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10$y$, 10$m$, 10$c$ and 10$k$ for producing images of four colors, yellow (Y), magenta (M), cyan (C) and black (K), which are color-separated according to a well-known subtractive color mixing process.

A convey mechanism 20 is disposed below the image forming units 10$y$, 10$m$, 10$c$ and 10$k$. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10$y$, 10$m$, 10$c$ and 10$k$ are arranged in tandem in the direction of conveyance of the convey belt 21.

Each of the image forming unit 10$y$, 10$m$, 10$c$ and 10$k$ includes a photosensitive drum 61$y$, 61$m$, 61$c$, 10$k$ serving as an image carrying body. The photosensitive drums 61$y$, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media (recording media), on which images formed by the image forming units 10y, 10m, 10c, 10k are to be transferred, are disposed below the convey mechanism 20.

A pick-up roller 23a, 23b is disposed at one end of each of the sheet cassettes 22a, 22b. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61m, 61c and 61k are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (Y, M, C, K) of respective colors separated by an image processing apparatus 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
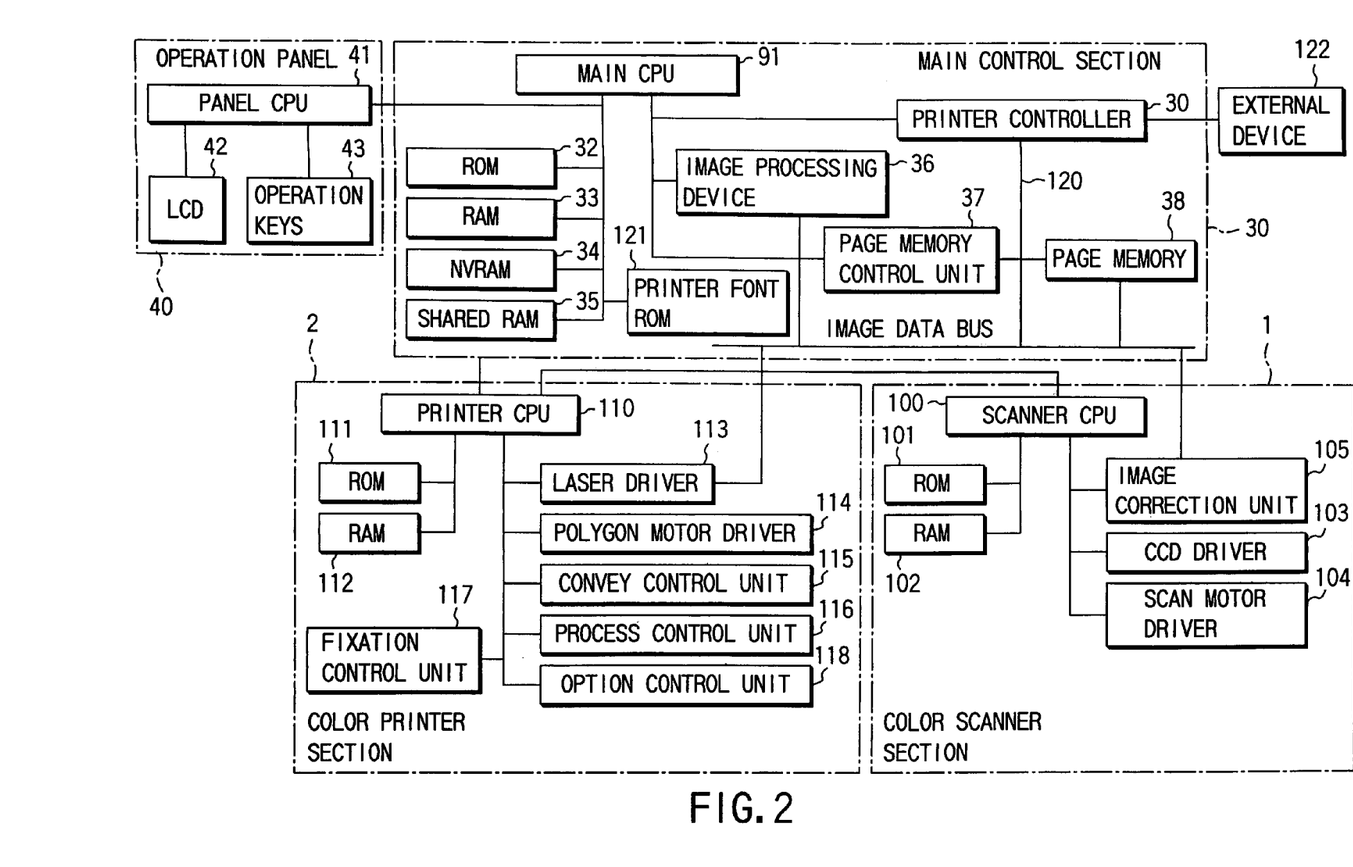
FIG. 2 is a block diagram schematically showing electrical connection of the image forming apparatus shown in FIG. 1 and flow of signals for control.

FIG. 2 is a block diagram schematically showing electrical connection of the image forming apparatus shown in FIG. 1 and flow of signals for control. In FIG. 2, a control system comprises three CPUs (Central Control Units): a main CPU 91 provided in a main control section 30; a scanner CPU 100 in the color scanner section 1; and a printer CPU 110 in the color printer section 2.

The main CPU 91 performs bi-directional communication with the printer CPU 110 via a shared RAM (Random Access Memory) 35. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display (LCD) 42, various operation keys 43 and a panel CPU to which the LCD 42 and operation keys 43 are connected. The operation panel 40 is connected to the main CPU 91.

The main control section 30 comprises the main CPU 91, a ROM (Read-Only Memory) 32, a RAM 33, an NVRAM 34, shared RAM 35, image processing apparatus 36, a page memory control unit 37, a page memory 38, a printer controller 39, and a printer font ROM 121.

The main CPU 91 controls the entirety of the main control section 30. The ROM 32 stores control programs, etc. The RAM 33 temporarily stores data.

The NVRAM (Non-Volatile RAM) 34 is a non-volatile memory backed up by a battery (not shown). Even when power is not supplied to the NVRAM 34, stored data is maintained.

The shared RAM 35 is used to perform bi-directional communication between the main CPU 91 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121, with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction unit 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs; etc.; a data storage RAM 112; a laser driver 113 for driving the semiconductor laser 60; a polygon motor driver 114 for driving the polygon motor 54 of the exposure device 50; a convey control unit 115 for controlling conveyance of the sheet P by the convey mechanism 20; a process control section 116 for controlling charging, developing and transferring processes using the charging device, developing roller and transfer device; a fixation control unit 117 for controlling the fixing device 80; and an option control unit 118 for control options.

The image processing apparatus 36, page memory 38, printer controller 39, image correction unit 105 and laser driver 113 are connected over an image data bus 120.

Figure 3:
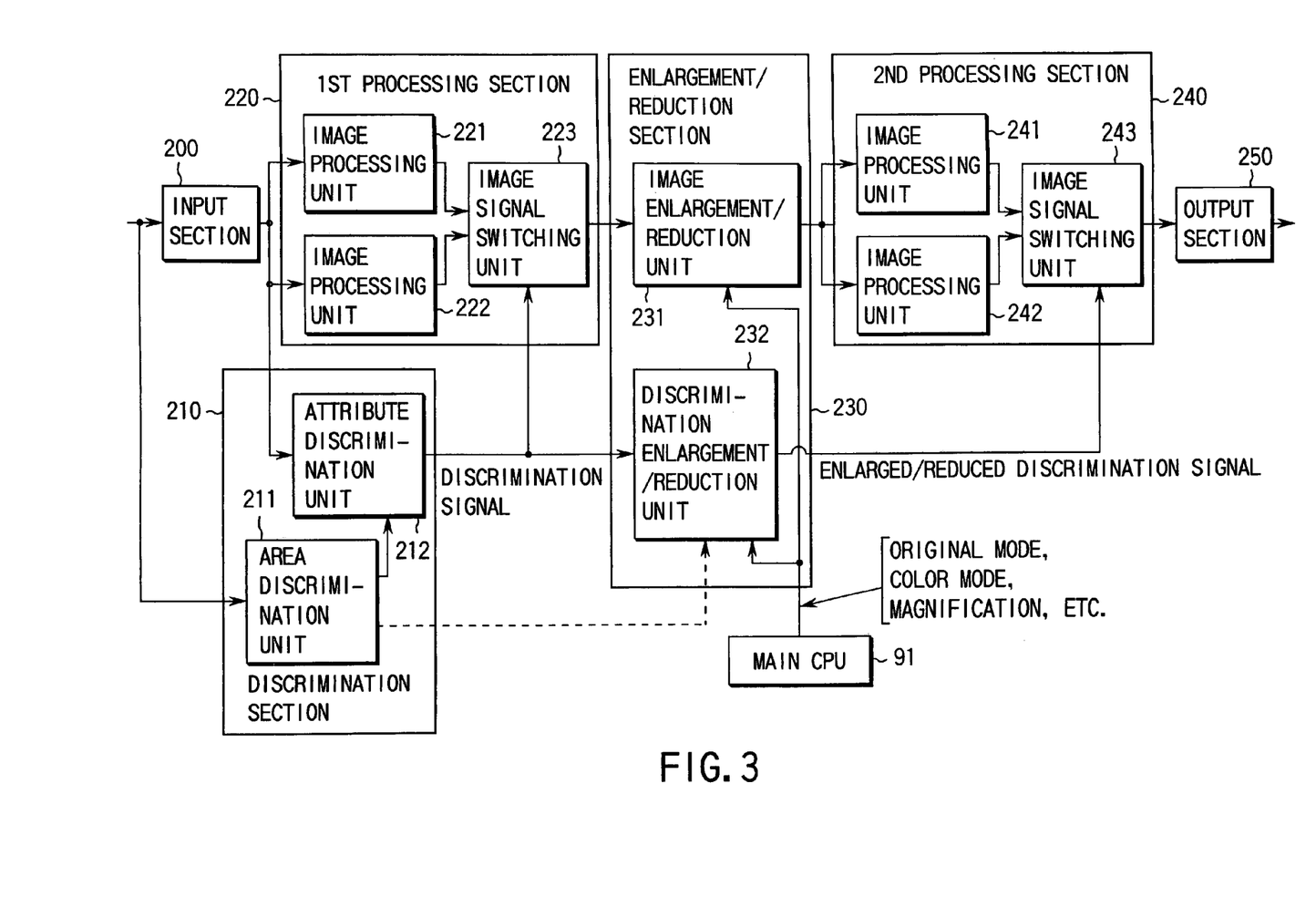
FIG. 3 is a block diagram showing a structure of the image processing apparatus shown in FIG. 2 according to a first embodiment of the invention.

FIG. 3 schematically shows the structure of the image processing apparatus 36. The image processing apparatus 36 comprises an input section 200 for subjecting image data from the color scanner section 1 to a color conversion process, etc.; a discrimination section 210 serving as discrimination means for producing a discrimination signal indicative of "character", "non-character", etc. on the basis of an image signal (to be also referred to as "image data") from the input section 200; a first processing section 220 serving as first image processing means for subjecting the image signal from the input section 200 to a filtering process, etc. and switching the processing method, etc. in accordance with the discrimination signal produced by the discrimination, section 210; an enlargement/reduction section 230 serving as enlargement/reduction means for enlarging/reducing the discrimination signal from the discrimination section 210 and the image signal from the first processing section 220; a second processing section 240 serving as image processing means for subjecting the enlarged/reduced image signal from the enlargement/reduction section 230 to a black-added printing process, a gamma conversion process, etc. and switching the processing method, etc. in accordance with the enlarged/reduced discrimination signal from the enlargement/reduction section 230; and an output section 250 for processing the image signal from the second processing section 240 to produce a printer output signal.

A detailed description will now be given of the respective sections.

The input section 200 subjects the image data from the color scanner section 1 to an input process. Specifically, if a color image process is to be performed in a subsequent stage, the input section 200 converts the R-, G- and B-image data from the color scanner section 1 to three-primary-color image data C (cyan), image data M (magenta) and image data Y (yellow) for controlling color materials for image formation in the color printer section 2. Various methods, such as masking equations, may be used for the color conversion. If a black-and-white image process is to be performed in a subsequent stage, the input section 200 produces a K (black) signal from the R-, G- and B-image data from the color scanner section 1 according to a conversion equation, e.g. $K=\{(1-R)+(1-G)+(1-B)\}/3$.

The thus produced C-, M- and Y-image data or the K signal, and the input R-, G- and B-image data are delivered to subsequent-stage sections such as the discrimination section 210 and first processing section 220.

The discrimination section 210 comprises an area discrimination unit 211 and an attribute discrimination unit 212. The area discrimination unit 211 generates frequency characteristic quantities from the R-, G- and B-image data from the color scanner section 1 and subjecting the generated frequency characteristic quantities to a smearing process, etc., thereby producing rectangular area discrimination signals. The rectangular area discrimination signals are sent to the attribute discrimination unit 212. The rectangular area discrimination signals represent area kinds such as "character area", "photography area" and "background area."

The R-, G- and B-image data input to the area discrimination section 211 is R-, G- and B-image data input by a pre-scan which is carried out prior to a main scan performed at the time of copying. In general, the pre-scan is performed at a lower resolution and at a higher speed than in the main scan.

The attribute discrimination section 212 generates differential characteristic quantities from the C-, M- and Y-image data or the K-signal from the input section 200 and subjects the generated qualities to an expansion process, etc., thereby producing character discrimination signals. In addition, depending on the purpose of use, the characteristic for discrimination is switched according to the rectangular area discrimination signals from the area discrimination section 211. The discrimination signals include, for example, a CMY discrimination signal and a K discrimination signal. The discrimination signal which is required in the processing in the subsequent-stage sections is used.

The first processing section 220 comprises an image processing unit 221, an image processing unit 222 and an image signal switching unit 223. The number of first processing sections 220 corresponds to the number of colors, C, M, Y and K, and each first processing section 220 independently performs a process for the associated color.

The image processing unit 221, 222 subjects the image signal from the input section 200 to a high-level emphasis filter process for edge emphasis, a low-level filter process for reducing moire, e.g. mesh-like points on the original, a correction process for an achromatic color area, etc. The image processing unit 221 and image processing unit 222, however, have different filtering characteristics, achromatic process characteristics, etc.

The image signal switching unit 223 selects one of the output from the image processing unit 221 and the output from the image processing unit 222 in accordance with the discrimination signal from the discrimination section 210. For example, in accordance with the discrimination signal representing "character" or "non-character," a signal with emphasis on contour may be selected for a pixel of a character portion and a signal with smoothness may be selected for a pixel of a non-character, background portion. As a result, the input image signal can be made clearer.

The enlargement/reduction section 230 comprises an image enlargement/reduction unit 231 and a discrimination enlargement/reduction unit 232, as will be described later in detail.

The second processing section 240 comprises an image processing unit 241, an image processing unit 242 and an image signal switching unit 243. Like the first processing section 220, the number of second processing sections 240 corresponds to the number of colors, C, M, Y and K, and each second processing unit 240 independently performs a process for the associated color.

The image processing units 241 and 242 subject the image signal from the image enlargement/reduction unit 231 to a gamma correction process for linearly correcting the input/output relation of the entire apparatus from the image input to the image output, a black-added printing process for generating the K signal from the CMY signals, etc. The image processing units 241 and 242, however, have different gamma correction characteristics and black-added printing process characteristics.

The image signal switching unit 243 selects one of the output from the image processing unit 241 and the output from the image processing unit 242 in accordance with the discrimination signal from the discrimination signal enlargement/reduction unit 232. For example, in accordance with the discrimination signal representing "character" or "non-character," a processed result matching with the pixel may be selected.

A detailed description will now be given of the discrimination signal enlargement/reduction unit 232 in the enlargement/reduction section 230, which is most important for the present invention.

Figure 4:
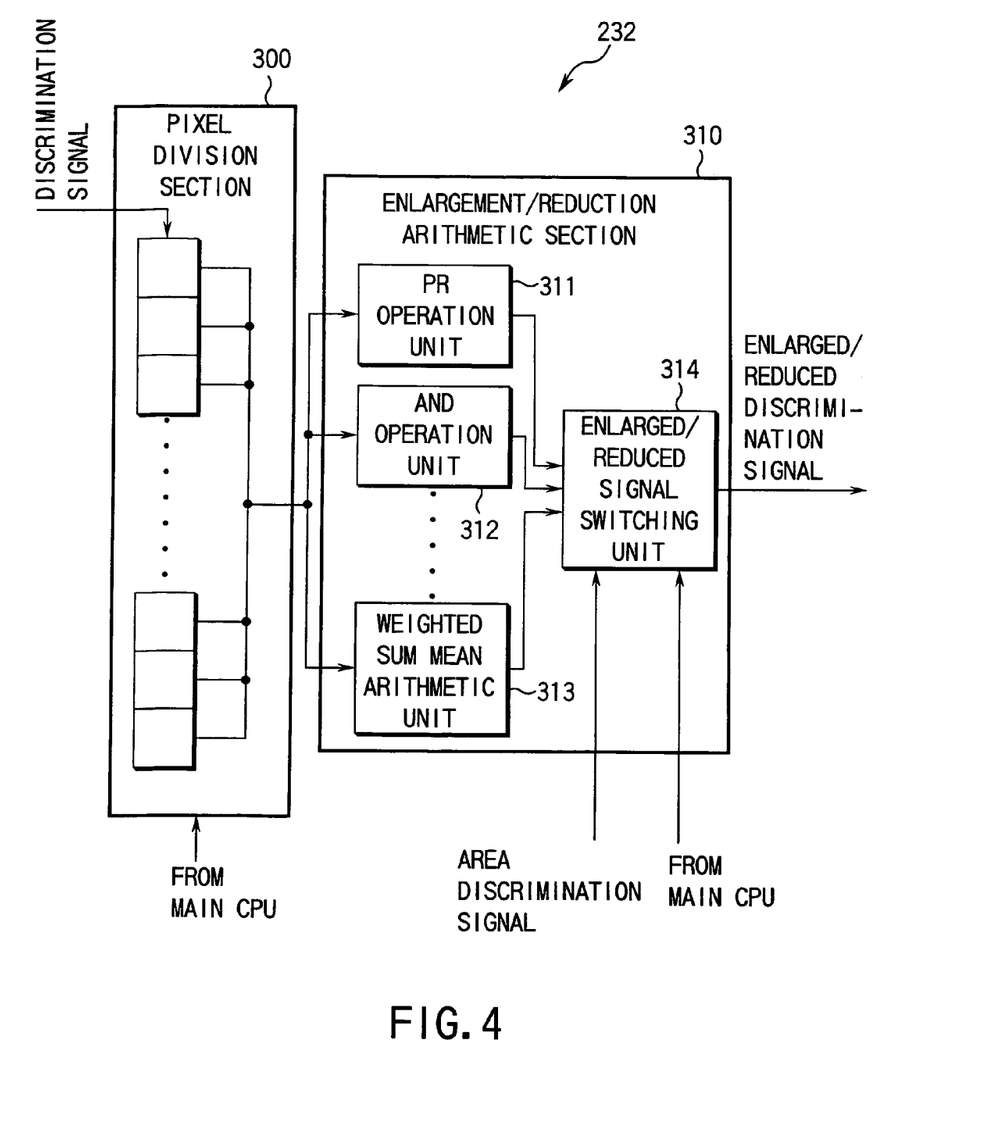
FIG. 4 is a block diagram showing the structure of a discrimination signal enlargement/reduction unit shown in FIG. 3.

FIG. 4 shows the structure of the discrimination signal enlargement/reduction unit 232 which comprises, in general terms, a pixel division section 300 and an enlargement/reduction arithmetic section 310. The pixel division section 300 receives the discrimination signal from the discrimination section 210, divides the associated pixels in accordance with a magnification instructed by the main CPU 91 or a magnification determined by a 2-in-1 function by which one copy is produced from two originals, and retains the divided pixels.

The number of division of pixels is calculated from an inverse number of the magnification. For example, where the magnification is 50%, 1÷0.5=2. Thus, the pixels associated with the discrimination signal are divided in units of two pixels and the divided pixels are retained. Where the magnification is 200%, 1÷2=0.5. Thus, the pixels are divided in units of a 0.5 pixel and the divided pixels are retained. In this case, however, the number 0.5 is rounded to 1, and the pixels are divided in units of one pixel.

Figure 5:
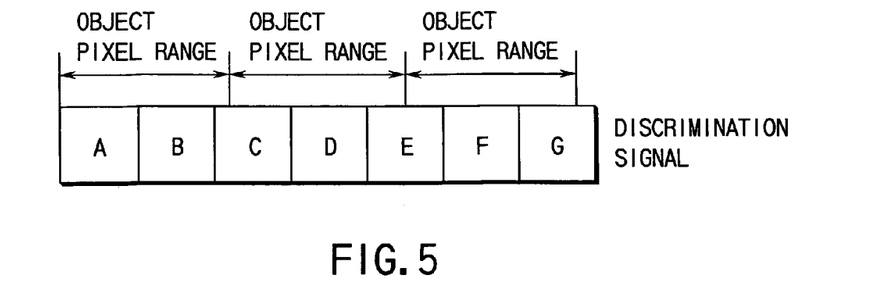
FIG. 5 is a view for explaining an operation of a pixel division section shown in FIG. 4.

FIG. 5 illustrates an example of division of pixels, where the magnification is 40%. Since the number of division of pixels is given by a formula, 1÷0.4≈2.2, the discrimination signal is divided in units of 2.2 associated pixels. Even where the pixels are divided in units of 2.2, as shown in FIG. 5, the number of object pixels becomes three. In this way, the pixels are not merely divided by an integer and retained, but they are divided in consideration of a decimal fraction.

The enlargement/reduction arithmetic section 310 subjects the thus divided object pixel range to predetermined arithmetic operations, and outputs the arithmetic result as one-pixel information. The enlargement/reduction arithmetic section 310 comprises a plurality of kinds of arithmetic units, for example, an OR (logical sum) operation unit 311, an AND (logical product) operation unit 312 and a weighted sum mean arithmetic unit 313, as well as an enlarged/reduced discrimination signal switching unit 314.

Figure 6:
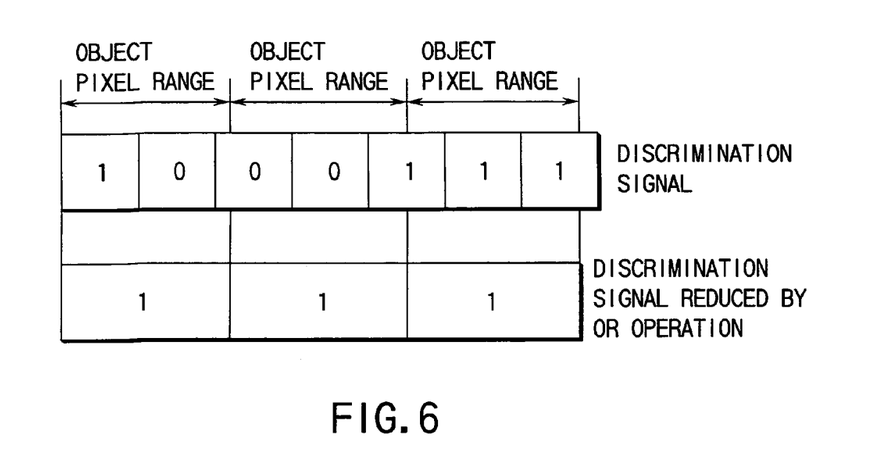
FIG. 6 is a view for explaining an OR operation in an enlargement/reduction arithmetic section shown in FIG. 4.
Figure 7:
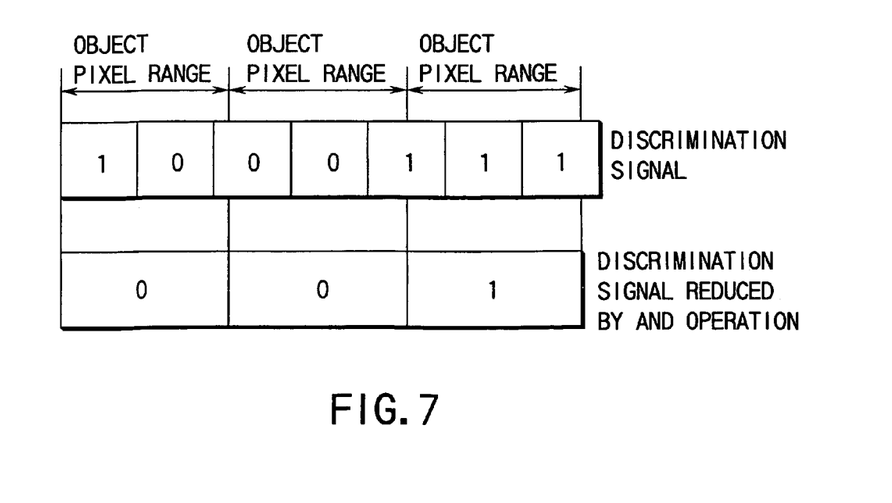
FIG. 7 is a view for explaining an AND operation in the enlargement/reduction arithmetic section shown in FIG. 4.

For instance, where the discrimination signal is a two-value signal, the associated pixels are expressed by "1" or "0". These pixels are subjected to an arithmetic operation such as an OR operation (logical sum operation), as illustrated in FIG. 6, or an AND operation (logical product operation), as illustrated in FIG. 7. As regards the enlarged/reduced discrimination signal obtained by these operations, the number of pixels with value "1" is large in the case of the OR operation and the number of pixels with value "0" is large in the case of the AND operation.

Assume that the discrimination signal with value "1" represents a character pixel, and the discrimination signal with value "0" represents a non-character pixel. Where the discrimination signal is reduced by the OR operation, the number of character pixels becomes large. Where the discrimination signal is reduced by the AND operation, the number of non-character pixels becomes large.

The enlarged/reduced discrimination signal switching unit 314 selects one of the enlarged/reduced discrimination signals obtained by the above-described different arithmetic operations, that is, one of the output signals from the operation units 311, 312 and 313, on the basis of information on an original mode, a color mode, etc. from the main CPU 91 or the discrimination signal from the area discrimination unit 211. If patterns of selection are predetermined in consideration of the characteristics of the above-described arithmetic operations, discrimination signals for designating image processes more suitable for the purpose of print output can be generated.

The respective components of the discrimination enlargement/reduction unit 232 are controlled by the main CPU 91. As regards data which needs to be supplied in advance to the associated section or unit, the main CPU 91 accesses the storage means such as ROM 32 and supplies such data to the associated section or unit.

A second embodiment of the present invention will now be described.

Figure 8:
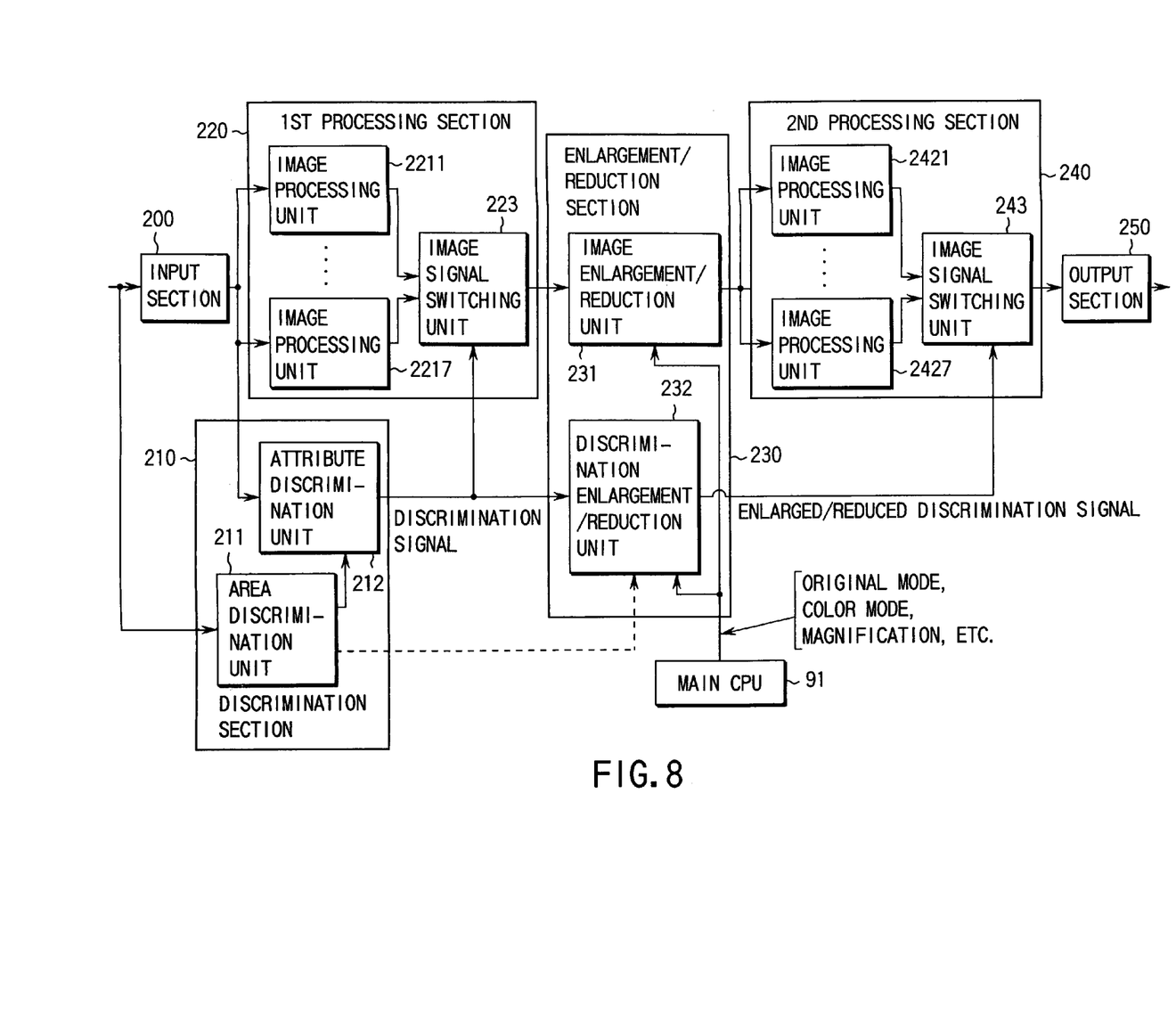
FIG. 8 is a block diagram showing a structure of the image processing apparatus shown in FIG. 2 according to a second embodiment of the invention.

FIG. 8 schematically shows the structure of the image processing apparatus 36 wherein a multi-value discrimination signal is produced. This image processing apparatus 36 differs from the image processing apparatus 36 of the first embodiment (FIG. 3) in that the number of image processing units in the first processing section 220 and the second processing section 240, which can be switched by the discrimination signal, is not two but three or more represented by the multi-value discrimination signal. In the embodiment shown in FIG. 8, the first processing section 220 includes seven image processing units 2211 to 2217 having mutually different filter characteristics and achromatic process characteristics. The second processing section 240 includes seven image processing units 2421 to 2427 having mutually different gamma correction characteristics and black-added printing process characteristics.

Figure 9:
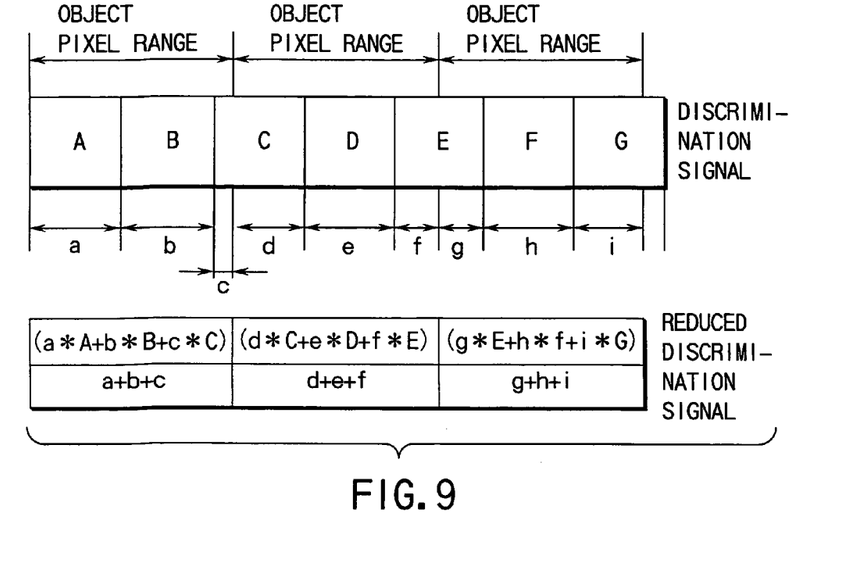
FIG. 9 is a view for explaining a first example of a weighted sum mean arithmetic operation in the enlargement/reduction arithmetic section shown in FIG. 4.

FIG. 9 shows a case where the weighted sum mean arithmetic operation is performed. Although the same is applicable to the case of the two-value signal, a description will now be given of the case of a multi-value signal which is considered particularly useful. Like FIG. 5, FIG. 9 shows a case where the magnification is 40%. Since the object pixel range is 2.2 pixels, both end pixels in each object pixel range are made to reflect designated ratios.

Figure 10:
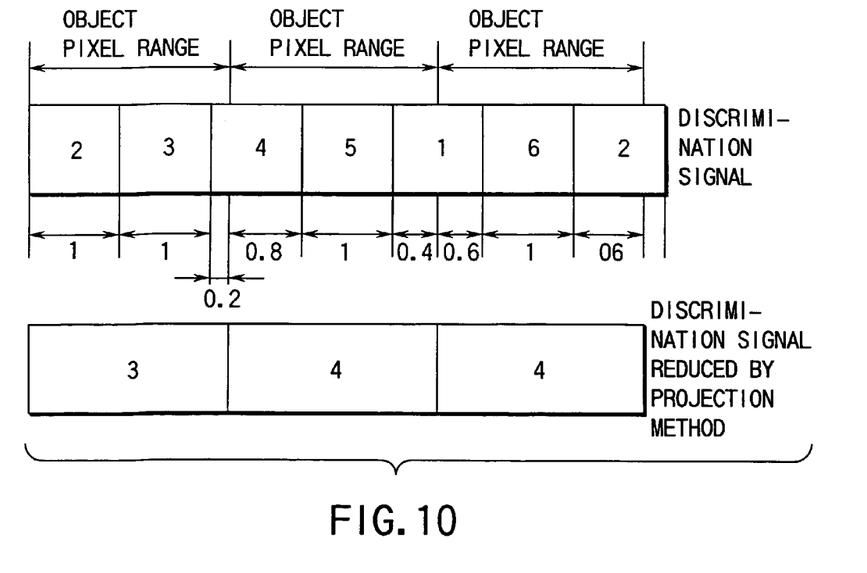
FIG. 10 is a view for explaining a second example of a weighted sum mean arithmetic operation in the enlargement/reduction arithmetic section shown in FIG. 4.

A specific example is shown in FIG. 10. Consider the 2.2 pixels of the first object pixel range. Since the magnification is 40%, a=1, b=1 and c=0.2. If the values of pixels are A=2, B=3 and C=4, the obtained reduced discrimination signal corresponding to one pixel is given by the formula below. The obtained value is rounded to 3, and a discrimination signal with value "3" is output.

$$\frac{a*A + b*B + c*C}{a+b+c} = \frac{1*2 + 1*3 + 0.2*4}{2.2} \approx 2.636$$

In general, the method of reflecting the designated ratios in the object pixel range is called a projection method in the reduction process, or a linear interpolation method in the enlargement process.

Apart from the weighted sum mean arithmetic operation, a maximum value selection operation in which a maximum value in the object pixel range is selected, a minimum value selection operation, and a mean value selection operation can be applied to the enlargement/reduction operations.

Figure 11:
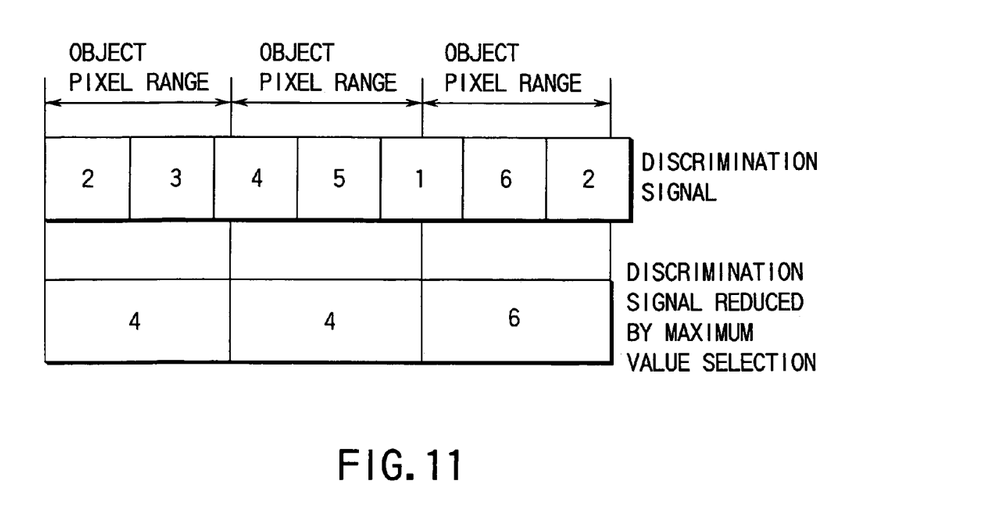
FIG. 11 is a view for explaining an example of the operation of the enlargement/reduction arithmetic section shown in FIG. 4, in which maximum value selection is adopted.
Figure 12:
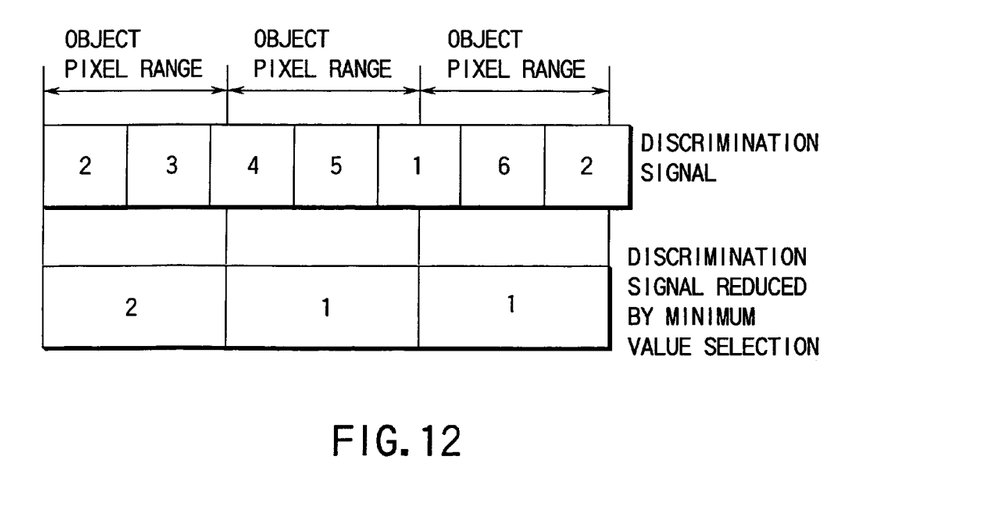
FIG. 12 is a view for explaining an example of the operation of the enlargement/reduction arithmetic section shown in FIG. 4, in which minimum value selection is adopted.

FIG. 11 illustrates an example of the maximum value selection operation for selecting the maximum value of the pixels in the object pixel range. FIG. 12 illustrates an example of the minimum value selection operation for selecting the minimum value of the pixels in the object pixel range. As is obvious from these figures, the maximum value selection provides a reduced discrimination signal with a greater value, and the minimum value selection provides a reduced discrimination signal with a less value.

Assume that a discrimination signal with value "7" indicates a character pixel, a discrimination signal with value "0" indicates a non-character pixel, and a discrimination value with an intermediate value indicates "the possibility of being a character pixel" according to the value. Thus, the greater the value of the discrimination signal, the higher the possibility of being a character pixel. The discrimination signal reduced by the maximum value selection may represent more character-like pixels, and the discrimination signal reduced by the minimum value selection may represent more non-character-like pixels. Where the discrimination signal is reduced by the projection method, it may have characteristics between the maximum value selection and minimum value selection.

Like the case where the discrimination signal is a two-value signal, the enlarged/reduced discrimination signal switching unit 314 selects one of the enlarged/reduced discrimination signals obtained by the above-described different arithmetic operations, on the basis of information on an original mode, a color mode, etc. from the main CPU 91 or the discrimination signal from the area discrimination unit 211. If patterns of selection are predetermined in consideration of the characteristics of the above-described arithmetic operations, discrimination signals for designating image processes more suitable for the purpose of print output can be generated.

As has been described above in detail, according to the present invention, the enlargement/reduction process method for the discrimination signal is switched on the basis of the characteristics of the input image. Based on the obtained discrimination signal, the image process matching with the input image is selected. Thereby, this invention can provide an image processing apparatus and an image forming method capable of performing an enlargement/reduction process with less error relative to an image on an original, thereby producing a high-quality output image.

Moreover, this invention can provide an image processing apparatus and an image forming method capable of producing, where an input image is a color image, an output image with still higher quality, by taking into account the image characteristic or chromatic characteristic associated with each of the colors of the image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for subjecting an input image signal to an enlargement/reduction process on the basis of a predetermined enlargement/reduction magnification, the apparatus comprising:

first discrimination means for generating a first discrimination signal by determining an attribute of each of at least one area obtained by dividing an input image on the basis of the input image signal;

second discrimination means for generating a second discrimination signal by determining an attribute of each of pixels on the basis of the input image signal and the first discrimination signal from the first discrimination means;

image enlargement/reduction means for subjecting the input image signal to the enlargement/reduction process on the basis of the enlargement/reduction magnification;

discrimination enlargement/reduction means for generating an enlarged/reduced discrimination signal by subjecting the second discrimination signal from the second discrimination means to the enlargement/reduction process on the basis of the enlargement/reduction magnification; and image processing means for performing an image process for the enlarged/reduced image signal from the image enlargement/reduction means on the basis of the enlarged/reduced discrimination signal, wherein said discrimination enlargement/reduction means comprises:

pixel division means for dividing pixel information associated with the second discrimination signal from the second discrimination means, which pixel information belongs to an object pixel range, on the basis of the enlargement/reduction magnification, and retaining the divided pixel information;

a plurality of arithmetic operation means for subjecting the pixel information belonging to the object pixel range, which has been divided by the pixel division means, to predetermined arithmetic operations, thereby outputting enlarged/reduced attribute discrimination signals associated with the pixels; and selection means for selecting one of the output signals from the plural arithmetic operation means on the basis of an externally provided switching condition and the first discrimination signal from the first discrimination means.

2. An image processing apparatus according to claim 1, wherein the externally provided switching condition, which is input to the selection means, is one of an enlargement/reduction magnification, a kind of an original, and an image process adjustment value, which are selected by external input operations.

3. An image processing apparatus according to claim 1, wherein where the second discrimination signal generated by the second discrimination means is a two-value signal, each of the plural arithmetic operation means of the discrimination enlargement/reduction means performs an arithmetic operation of one of a logical sum of pixel information in an object range divided by the pixel division means, a logical product of the pixel information in the object range divided by the pixel division means, a pixel value at a fixed position such as a first pixel or a last pixel in the object range, and a weighted sum corresponding to the magnification.

4. An image processing apparatus according to claim 1, wherein where the second discrimination signal generated by the second discrimination means is a multi-value signal, each of the plural arithmetic operation means of the discrimination enlargement/reduction means performs an arithmetic operation of one of a pixel value at a fixed position, such as a first pixel or a last pixel, of pixel information in an object range divided by the pixel division means, a maximum or minimum value of the pixel information in the object range, and a weighted sum corresponding to the magnification.

5. An image processing apparatus that subjects an input image signal to an enlargement/reduction process on the basis of a predetermined enlargement/reduction magnification, the apparatus comprising:

a first discrimination unit configured to generate a first discrimination signal by determining an attribute of each of at least one area obtained by dividing an input image on the basis of the input image signal;

a second discrimination unit configured to generate a second discrimination signal by determining an attribute of each of pixels on the basis of the input image signal and the first discrimination signal from the first discrimination unit;

an image enlargement/reduction unit configured to subject the input image signal to the enlargement/reduction process on the basis of the enlargement/reduction magnification;

a discrimination enlargement/reduction unit configured to generate an enlarged/reduced discrimination signal by subjecting the second discrimination signal from the second discrimination unit to the enlargement/reduction process on the basis of the enlargement/reduction magnification; and an image processing unit configured to perform an image process on the enlarged/reduced image signal from the image enlargement/reduction unit on the basis of the enlarged/reduced discrimination signal, wherein said discrimination enlargement/reduction unit comprises:

pixel division unit configured to divide pixel information associated with the second discrimination signal from the second discrimination unit, which pixel information belongs to an object pixel range, on the basis of the enlargement/reduction magnification, and retain the divided pixel information;

a plurality of arithmetic operation units configured to subject the pixel information belonging to the object pixel range, which has been divided by the pixel division unit, to predetermined arithmetic operations, and thereby output enlarged/reduced attribute discrimination signals associated with the pixels; and a selection unit configured to select one of the output signals from the plural arithmetic operation units on the basis of an externally provided switching condition and the first discrimination signal from the first discrimination unit.

6. An image processing apparatus according to claim 5, wherein the externally provided switching condition, which is input to the selection unit, is one of an enlargement/reduction magnification, a kind of an original, and an image process adjustment value, which are selected by external input operations.

7. An image processing apparatus according to claim 5, wherein where the second discrimination signal generated by the second discrimination unit is a two-value signal, each of the plural arithmetic operation units of the discrimination enlargement/reduction unit performs an arithmetic operation of one of a logical sum of pixel information in an object range divided by the pixel division unit, a logical product of the pixel information in the object range divided by the pixel division unit, a pixel value at a fixed position such as a first pixel or a last pixel in the object range, and a weighted sum corresponding to the magnification.

8. An image processing apparatus according to claim 5, wherein where the second discrimination signal generated by the second discrimination unit is a multi-value signal, each of the plural arithmetic operation units of the discrimination enlargement/reduction unit performs an arithmetic operation of one of a pixel value at a fixed position, such as a first pixel or a last pixel, of pixel information in an object range divided by the pixel division unit, a maximum or minimum value of the pixel information in the object range, and a weighted sum corresponding to the magnification.

9. An image processing method that subjects an input image signal to an enlargement/reduction process on the basis of a predetermined enlargement/reduction magnification, the method comprising:

generating a first discrimination signal by determining an attribute of each of at least one area obtained by dividing an input image on the basis of the input image signal;

generating a second discrimination signal by determining an attribute of each of pixels on the basis of the input image signal and the first discrimination signal;

subjecting the input image signal to the enlargement/reduction process on the basis of the enlargement/reduction magnification;

generating an enlarged/reduced discrimination signal by subjecting the second discrimination signal to the enlargement/reduction process on the basis of the enlargement/reduction magnification;

performing an image process for the enlarged/reduced image signal on the basis of the enlarged/reduced discrimination signal;

dividing pixel information associated with the second discrimination signal, which pixel information belongs to an object pixel range, on the basis of the enlargement/reduction magnification, and retaining the divided pixel information;

subjecting the pixel information belonging to the object pixel range, to predetermined arithmetic operations, thereby outputting enlarged/reduced attribute discrimination signals associated with the pixels; and selecting one of the output signals on the basis of an externally provided switching condition and the first discrimination signal.

10. An image processing method according to claim 9, wherein the externally provided switching condition, is one of an enlargement/reduction magnification, a kind of an original, and an image process adjustment value, which are selected by external input operations.

11. An image processing method according to claim 9, further comprising performing an arithmetic operation of one of a logical sum of pixel information in an object range, a logical product of the pixel information in the object range, a pixel value at a fixed position such as a first pixel or a last pixel in the object range, and a weighted sum corresponding to the magnification, wherein the second discrimination signal is a two-value signal.

12. An image processing method according to claim 9, further comprising performing an arithmetic operation of one of a pixel value at a fixed position, such as a first pixel or a last pixel, of pixel information in an object range, a maximum or minimum value of the pixel information in the object range, and a weighted sum corresponding to the magnification, wherein the second discrimination signal is a multi-value signal.

* * * * *